ately 1 prior to cut the thin chiplike flakes to
United States Patent

[11] 3,603,239

| [72] | Inventor | Teodoro A. Coutino<br>Blvd. Liberacion 5-55 Zone 9, Guatemala City, Guatemala |
|---|---|---|
| [21] | Appl. No. | 12,931 |
| [22] | Filed | Feb. 20, 1970 |
| [45] | Patented | Sept. 7, 1971 |

[54] COOKED FOOD PRODUCT ARRANGEMENT
18 Claims, 17 Drawing Figs.

[52] U.S. Cl. .................................................. 99/239,
99/100, 99/355
[51] Int. Cl. .................................................. A23b 7/00
[50] Field of Search .......................................... 99/355,
353, 239, 240, 423, 100; 107/1 A, 4, 8 L, 60, 69, 70

[56] References Cited
UNITED STATES PATENTS

| 755,123 | 3/1904 | Flygare .................... | 99/423 |
| 1,152,184 | 8/1915 | Kluge ....................... | 99/423 X |
| 1,639,168 | 8/1927 | Dorozynski ................ | 99/423 X |
| 2,434,339 | 1/1948 | Stiles ........................ | 107/8 L X |
| 3,264,974 | 8/1966 | Miller et al. ............... | 99/423 |
| 3,354,842 | 11/1967 | Manspeaker .............. | 107/69 X |
| 3,489,106 | 1/1970 | Lostanlen .................. | 107/60 |
| 3,510,314 | 5/1970 | Lima et al. ................. | 99/100 |

Primary Examiner—Walter A. Scheel
Assistant Examiner—Arthur O. Henderson
Attorney—Finkelstein and Mueth ABSTRACT: An arrangement for providing a thin chiplike food product from various types of fruits is described. The fruits are stored and exposed to any necessary preconditioning prior to pulping. Pulping takes place in one or more pulping tanks wherein the fruit is reduced to a fluidlike consistency and is transported by, for example, a gas pressure feed from the pulping tanks to a plurality of nozzle means. The nozzle means is positioned adjacent the external surfaces of heated, rotating drums and the fluidlike pulp is discharged from the nozzle means onto the external surfaces of the drums where it is cooked during the dwell time on the drums. Knives are provided adjacent the external surface of the drums for cutting the cooked pulp into desired sizes and shapes and for removing the dried and cut chips on the drum. A transportation means is provided to then transport the thin chiplike flakes to remote regions for appropriate packaging.

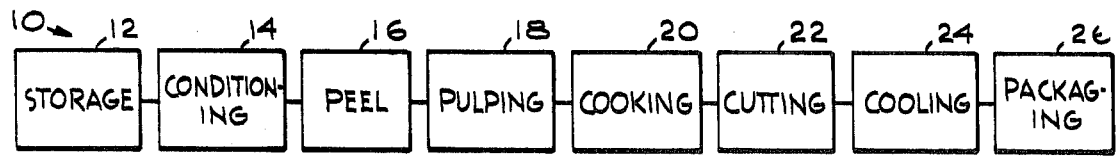
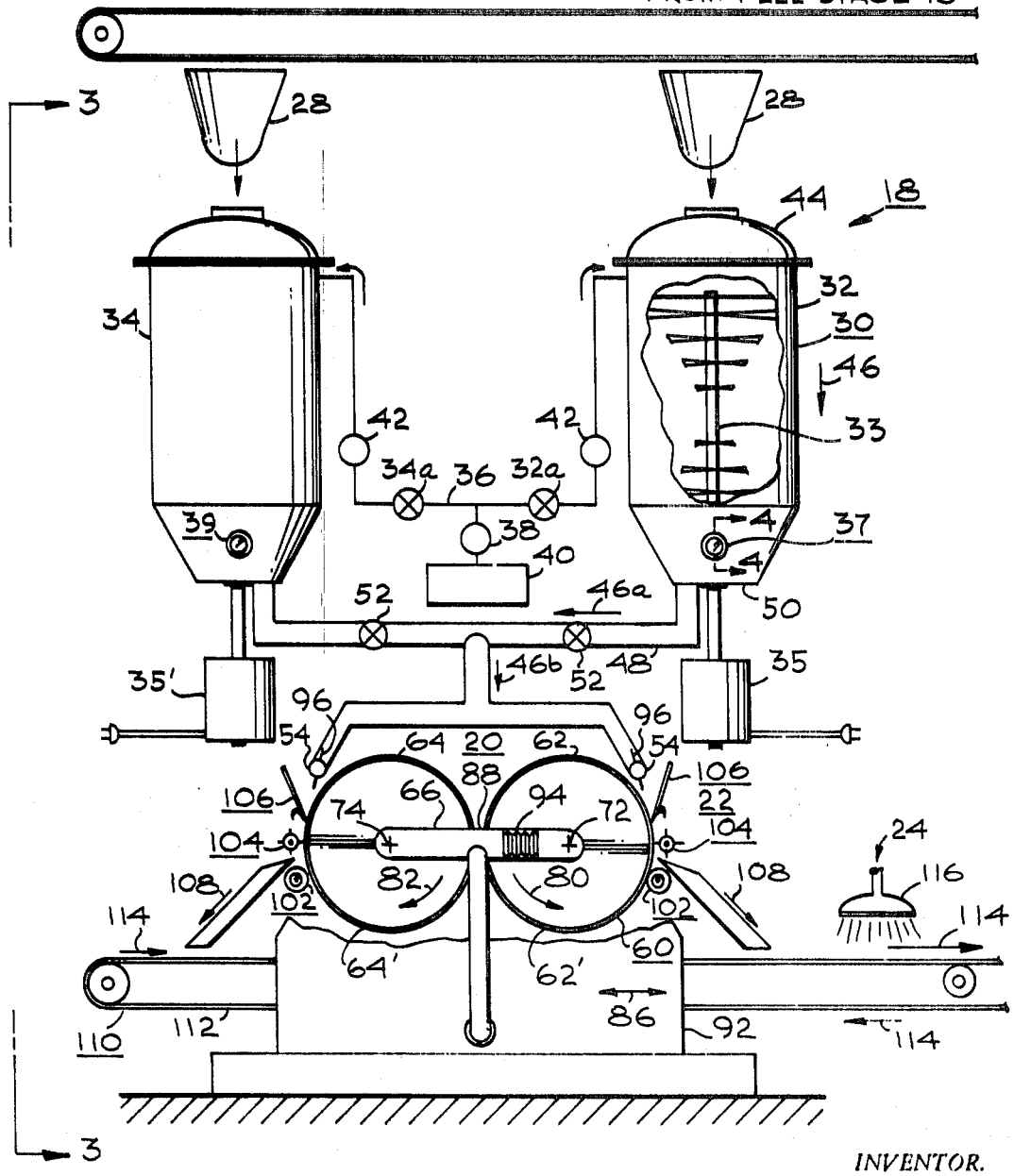

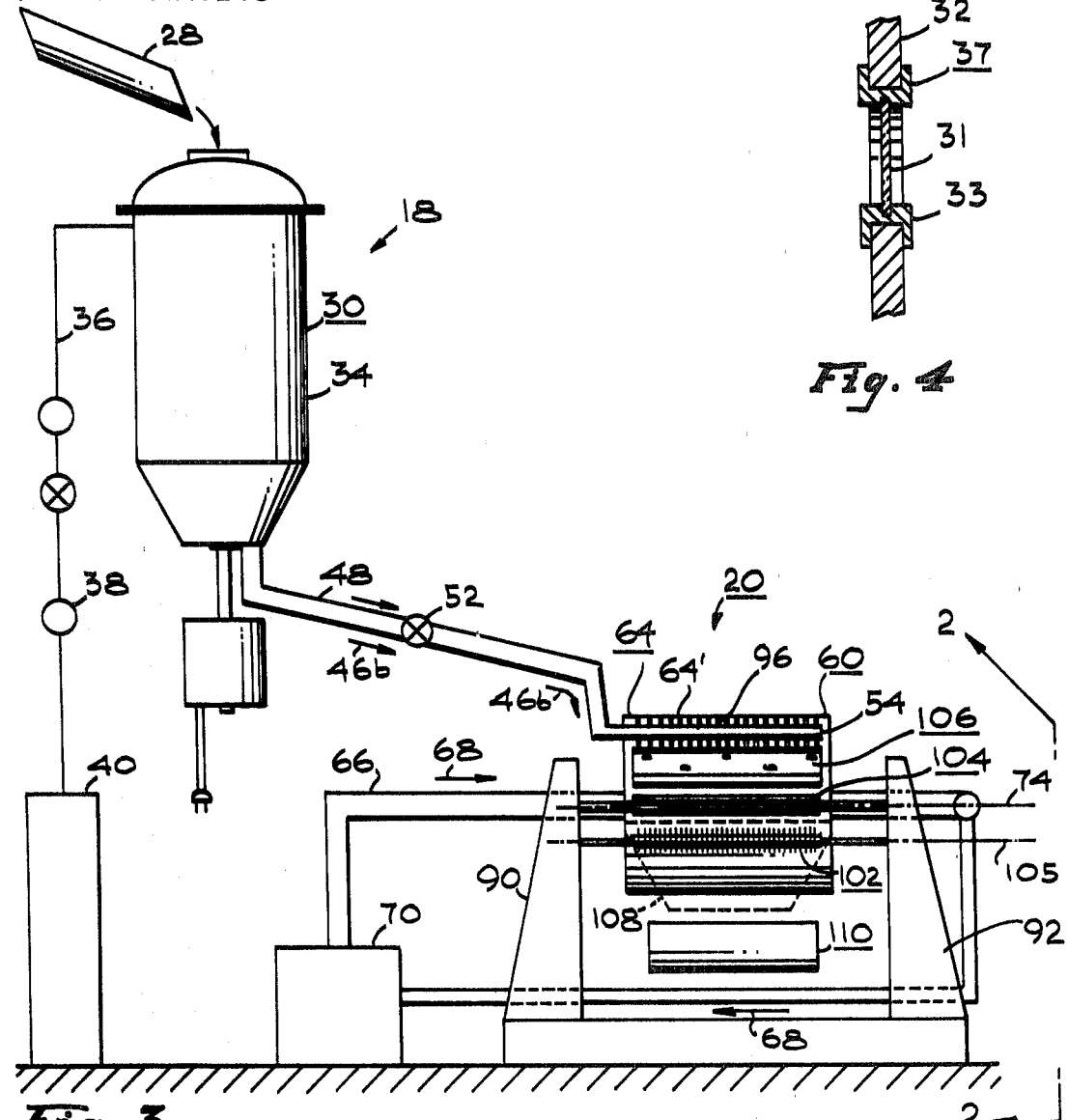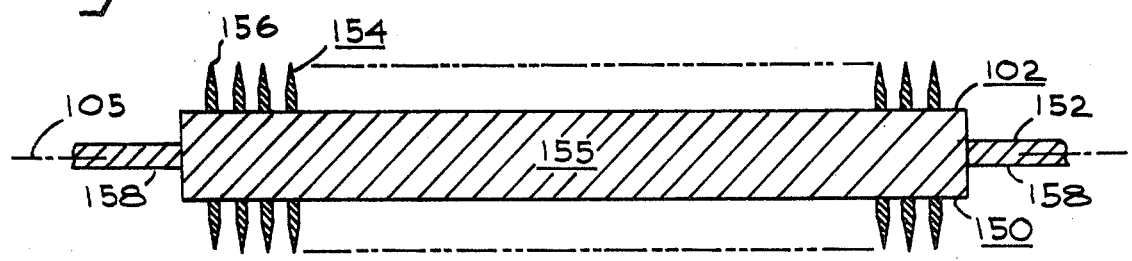

PATENTED SEP 7 1971 3,603,239
SHEET 3 OF 4
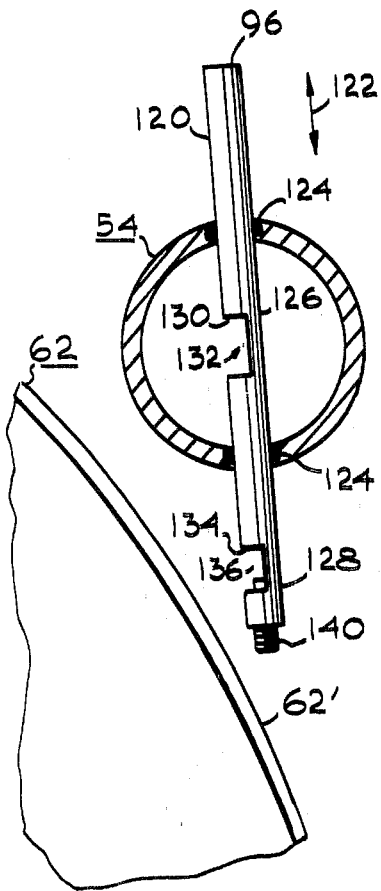
Fig. 6
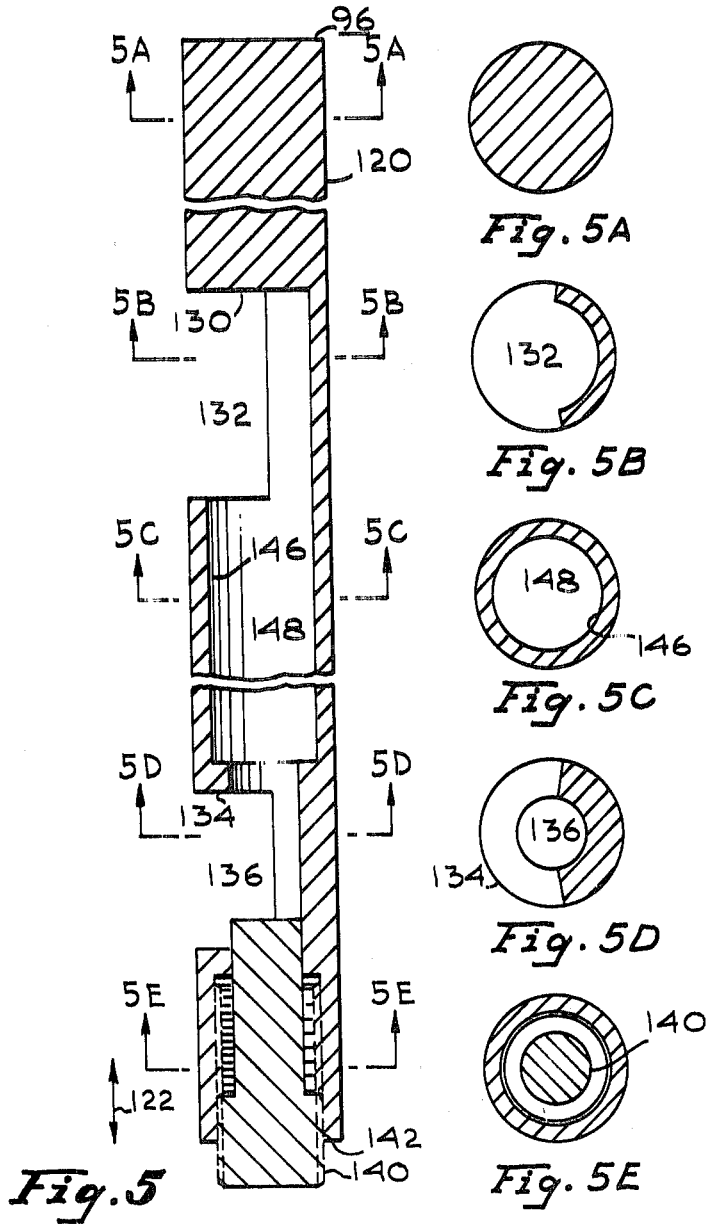
Fig. 5
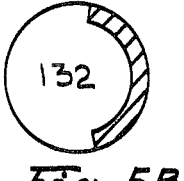
Fig. 5A
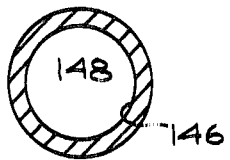
Fig. 5B
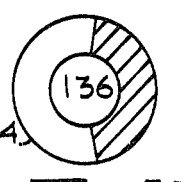
Fig. 5C
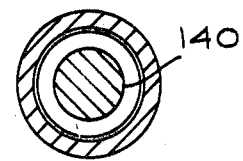
Fig. 5D
Fig. 5E
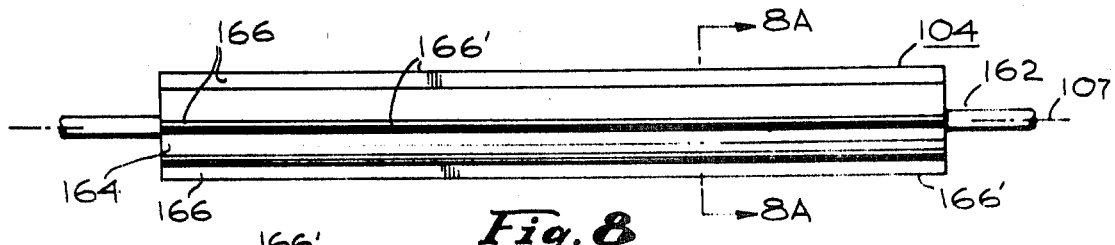
Fig. 8
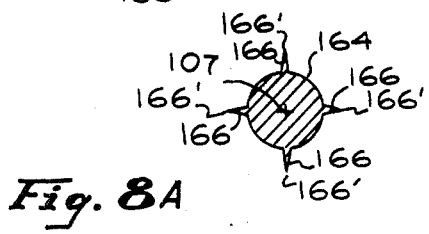
Fig. 8A
INVENTOR.
TEODORO ARMIN COUTINO
BY
Finkelstein & Mueth
ATTORNEYS

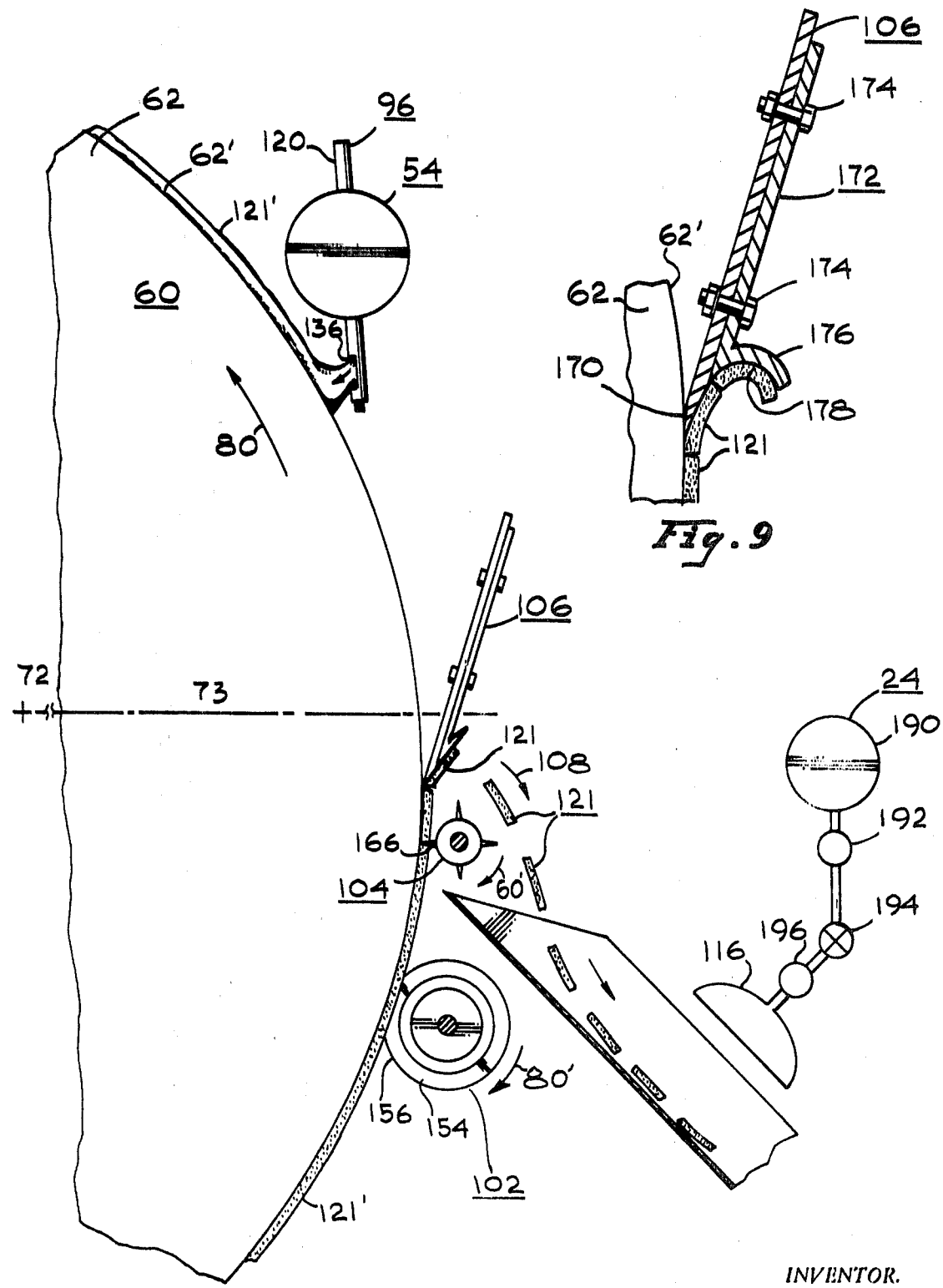

3,603,239

COOKED FOOD PRODUCT ARRANGEMENT

BACKGROUND OF THE INVENTION

1. Field of the Invention

This invention relates to the food art and more particularly to an improved arrangement for providing a thin, cooked chiplike flake manufactured from fruits.

2. Description of the Prior Art

Because of the perishable nature of many fruits, particularly tropical type fruits, cooking, storing and shipping of the fruits so that they may be enjoyed by people in regions remote from the area where such fruits are grown has often proved expensive, if not impractical. Therefore, it has long been desired to provide a food product made from such fruits wherein the essential ingredients in the fruits, as well as any desired nutritional or taste selective additives are provided. Further, fabrication of such a food product from the fruits often provides additional industry, jobs and employment for the people living in areas where the fruits are grown, which areas are often economically depressed.

To meet this need there have been proposed, in the past, various fabrication and manufacturing arrangements for making chiplike flakes from various fruits such as bananas, or the like. In these procedures the fruits have been stored, preconditioned as necessary, peeled and pulped to a fluidlike consistency before being cooked such cooking often occurred upon heated rollers. Many examples of such procedures and manufacturing techniques are known. However, the techniques for transporting the pulped fruits in their fluidlike consistency as well as the techniques for cutting and removing the cooked pulp from the heated drums have not always proven to be completely satisfactory. For example, since even the same type of fruit so often of a variable consistency depending upon when it is picked, weather conditions under which it is grown, and the like, the nozzles for spraying the fluidlike pulp onto the heated drums are preferably not fixed but variable in both discharge area and in distance from the drum in order to allow proper selection of those parameters necessary for appropriate spraying of the fluidized pulp onto the heated external surface of the drum. Also, where a pair of contrarotating drums are utilized, it is often also desirable to have a variable distance between the axis of rotation of the drums so that minimum clearance between the contrarotating drums may be varied to suit the particular type of fruit and/or consistency thereof.

Additionally, in the prior art types of manufacturing arrangements, techniques for feeding the fluidlike pulp as well as cutting the cooked pulp on the external surface of the drum has not always proven satisfactory in providing desired shapes of the fruit in the most economical fashion.

SUMMARY OF THE INVENTION

Accordingly, it is an object of the invention herein to provide an improved food product manufacturing arrangement.

It is another object of the invention herein to provide a food product manufacturing arrangement for fabricating thin chiplike flakes of a cooked fruit.

It is another object of the invention herein to provide an improved structural arrangement for making thin chiplike food products from pulped fruits in an economical fashion.

The above and other objects of the invention are achieved, according to a preferred aspect thereof, by providing a fruit storage and preparation means wherein the fruits, from which it is desired to manufacture the chiplike food product, may be suitably stored until ready for use and/or prepared for introduction into the manufacturing process. For example, when bananas are used, they are generally stored in a humidity and temperature controlled environment until ready for use and then immediately prior to use, they are often times exposed to carbon monoxide for preselected time periods as desired.

The fruits are then peeled and introduced into the pulping tanks. Applicant prefers to provide a pair of pulping tanks, each of which comprises a pressure vessel, having a rotating shaft therein with a plurality of paddle blades attached to the shaft. An electric motor, for example, mounted externally each of the tanks, may be utilized to rotate the shaft and the paddles. A viewport is also provided so that visual inspection of the condition e material within the pulping tanks may be made.

It is the function of the pulping tanks to reduce the fruits, for example bananas, to a fluidlike pulp consistency such that they may be fed, for example, by gas pressure feeding, to a pair of headers. Thus, with the pulping tanks acting as pressure vessels there is introduced gas, such as nitrogen, under pressure into the top of the tanks and this forces the fluidlike pulp from a discharge port at the bottom of the pulping tanks into the piping system supplying the headers.

In preferred arrangements of the invention the tanks are used sequentially. That is, while one tank is making the pulp and transferring same to the headers the other tank may, for example, be in the process of being cleaned, services and/or filled with fruit to be pulped. Thus, by providing two tanks, substantially continuous operation may be had in a system that is inherently a batch process.

The headers comprise elongated pipes for transfer of the pulp and have a plurality of nozzle means mounted therein in a spaced-apart relationship. For example, with the pipe extending in a preselected direction the nozzle means may be moveably mounted in the pipes along axial directions thereof ad in spaced-apart relationship to each other.

In preferred embodiments of the invention the nozzle means comprises a plurality of tubular members extending through the pipes comprising the headers. The tubular members have a pulp receiving aperture in the walls thereof positioned within the header for receiving the pulp that is transmitted through the header. The tubular members also have a discharge portion external of the header pipes and the discharge portion has a discharge orifice therein. The tubular members are provided with an internal tubular passageway between the pulp receiving aperture and the discharge orifice. The tubular members slideably moveable in the header pipes so that the discharge portion may be moved towards and away from the header pipes by greater or less separations therefrom as desired. Additionally, in preferred embodiments of the invention, means are provided for varying the discharge orifice size so that discharge flow rates may be adjusted for varying conditions of pulp consistency, type of fruit, gas pressure, feed rates, and the like.

A heated drum means is rotatably mounted in fluid receiving relationship to the plurality of nozzle means for receiving the pulp on the external surfaces thereof as it is discharged from the discharge orifices of the tubular members. The axis of rotation of the drum means is aligned parallel to the array of tubular members. In preferred embodiments of the invention, there are a pair of drums mounted on parallel axes and rotated in contrarotating directions by, for example, an electric motor. With the drum axes aligned in a horizontal plane the contrarotation of the drums is selected so that movements of the external surfaces of the drums is downwards in the regions between the drums. Preferably, the axis of the drums are spaced a preselected distance apart to help regulate the thickness of the coating of pulp applied to the external surfaces of the drums. Additionally, if desired, one of the two drums may be moveably mounted with respect to the other in order to allow variation of the minimum separation distance between the drums depending upon the thickness of coating desired thereon. The drums may be heated by any desired means such as, for example, hot water flowing therethrough, radiant internal heating, or the like.

When such a pair of heated contrarotating drums are utilized, it is preferred that there be two axially aligned arrays of nozzle means, one positioned adjacent each of the drums. It is preferred that the nozzles be aligned above the horizontal plane of the axis of rotation of the drums and on the upwardly moving quadrant of the external surface thereof so that rotation of the drums carries the pulplike material deposited thereon to the maximum elevation and then downwardly towards the minimum separation between the drums.

A first cutter means and a second cutter means are positioned adjacent the drum means and, in the preferred embodiment of the invention wherein the two drums are utilized, the first cutter means comprises a pair of first cutters and the second cutter means comprises a pair of second cutters one of each positioned in preselected locations adjacent the external surface of the first drum and the second drum. Each of the first cutters is in cooked pulp cutting relationship to the heated external surface of the adjacent drum means and cuts the cooked pulp on the external surface of the drum along preselected first cut-lines and divides the cooked pulp into a plurality of elongated strips. The strips are substantially circumferentially oriented with respect to the drum. Each of the second cutters are also in cooked pulp cutting relationship to the heated external surface of the adjacent drums and cuts the cooked pulp along second preselected cut-lines. The second cut-lines extend substantially parallel to the predetermined rotational axis of the drums and, accordingly, are substantially perpendicular to the first preselected cut-lines.

Scraper means comprising a pair of scrapers, one adjacent each drum, are also provided and are mounted in scraping engaging relationship with the external surface of each drum to scrape therefrom the cooked and cut chiplike flakes that are provided. Such cooked and cut chiplike flakes after being scraped from the surface of the drum fall to a moving belt, which comprises a transportation system for removing the cooked and cut chiplike flakes to remote areas for appropriate packaging. If desired, in accordance with well-known techniques, the cooked and cut chiplike flakes, after removal from the external surface of the drum, may be subjected to a cool air blast for achieving appropriate cooling effect thereon.

In the preferred embodiment of applicant's invention the first cutter means may be positioned in the lower quadrant wherein the external surface of the drum is moving in a generally upwardly direction but below the plane of the pair of rotational axes so that the cooked pulp is first cut by the first cutter means into the circumferentially oriented strips. The second cutter means is spaced apart in the direction of rotation of the drum from the first cutter means and cuts the elongated strips of cooked pulp on the drum along second cut-lines to provide the chiplike shape. The scraper means is spaced apart from the second cutter means in the direction of rotation of the external surface of the drum and is intermediate the second cutter means and the nozzle means.

BRIEF DESCRIPTION OF THE DRAWINGS

The above and other objects of applicant's invention may be more fully understood from the following detailed description taken together with the accompanying drawings wherein similar reference characters refer to similar elements throughout and in which:

FIG. 1 is a block diagram illustrating the stages of manufacturing processes utilized in the practice of the invention;

FIGS. 2, 3 and 4 illustrate in generally semischematic representation, the structure utilized in the pulping, cooking and cutting stages of manufacture;

FIGS. 5, 5A, 5B, 5C, 5D, 5E and FIG. 6 illustrate nozzle means useful in the practice of the invention herein;

FIGS. 7 and 7A illustrate a first cutter means useful in the practice of the invention herein;

FIG. 8 and 8A illustrate a second cutter useful in the practice of the invention herein;

FIG. 9 illustrates scraper means useful in the practice of the invention herein; and FIG. 10 illustrates the spatial relationship of the structure comprising the invention herein.

DESCRIPTION OF THE PREFERRED EMBODIMENTS

Before detailing the description of the preferred embodiments of the invention herein, it will be appreciated that there has been selected for illustration the utilization of the structure comprising the invention in the preparation of a chiplike food product made from bananas. The utilization of bananas has been selected to illustrate the various stages and manufacturing techniques according to the principles of the invention herein. However, other fruits such as mangoes, guava, papaya, pineapple, peaches, apples or the like, may equally well be utilized according to the principles hereof and the invention herein is not limited to preparation of banana flakes but rather, of course, the structure described and claimed herein may be utilized in any desired manufacturing processes for providing such chiplike food products.

Referring now to FIG. 1, there is illustrated, in block diagram form, the various stages of a complete manufacturing system for the preparation of chiplike flakes flakes from a fruit such as bananas. The overall structural arrangement which may be generally designated as a manufacturing process 10, is comprised of a storage stage 12 and a conditioning stage 14. The storage stage 12 and the conditioning stage 14 may comprise any type of desired temperature, humidity and ambient environmental atmosphere control that may be desired for the particular fruit.

After conditioning in conditioning stage 14 the fruit, for example, the bananas, may be peeled in the peel stage 16, where, if desired, the seed core may be removed after cutting. The utilization of other fruits may necessitate, of course, the removal of such cores and seeds as well as stem portions and the like.

After leaving the peel stage 16 the fruit enters the pulping stage 18 wherein it is pulped to a fluidlike consistency. In the pulping stage, if desired, additives such as vitamins, flour, cereals, minerals and/or flavorings may be added as desired for any particular type of fruit and/or any nutritional enhancement of the finished product. After leaving the pulping stage 18 the fluidlike consistency pulp enters the cooking stage 20 and after cooking is cut in the cutting stage 22 to desired sizes and shapes.

After leaving the cutting stage 22 in the desired chiplike form it may be cooled by cooling stage 24 and then removed by transportation means to a packaging stage 26 for appropriate packaging and shipping.

In general, the requirements for storage in the storage stage 12, conditioning in the conditioning stage 14 and peeling in the peel stage 16 are generally well known in the art for different types of fruits and the machinery and apparatus and structure therefore have long been utilized. The invention herein is primarily concerned with improvements to the pulping stage 18, cooking stage 20 and cutting stage 22. These steps and the structure preferred for accomplishing the desired objectives of the invention are described in greater detail below. Similarly, the cooling stage 24 and packaging stage 26, while necessary for an overall manufacturing arrangement utilizing the invention herein, are also well known in the art and do not in themselves for part of the invention.

It will be appreciated that many and varied techniques may be incorporated in the storage stage 12, conditioning stage 14, peeling stage 16 as well as the cooling stage 24 and packaging stage 26 in the practice of the invention.

Additionally, homogenization of the pulp fruits after the stage 18 may also be utilized and this has been found to be particularly advantageous in fabrication of chiplike flakes from bananas. By homogenizing a uniform product may be generally obtained wherein the film or sheet formed by drying in the cooking stage, as described in greater detail to provide a substantially uniform flake. In the absence of such homogenization has often been found than uneven film or sheet of a nonuniform thickness is obtained to cause variations in the type of flake.

Similarly, various preservatives, vitamins, minerals, cereals, flour, or the like may be added at any desired stage to the fruit for enhanced nutritional value.

Referring now to FIGS. 2, 3, and 4 there is shown, in a semischematic representation, the structure generally comprising the pulping stage 18, cooking stage 20 and cutting stage 22 according to the principles of the present invention. As shown thereon, the fruit is received from peel stage 16 in conveyor troughs 28 from which they pass into a pulping means 30 which comprises a pair of similar pulping tanks 32 and 34. The pulping tanks 32 and 34 are substantially identical and, in accordance with the principles of the present invention, are utilized sequentially. That is, initially pulping tank 32 is filled with fruit to be pulped and then operated to pulp the fruit and discharge the same therefrom. During this time, pulping tank 34 may be cleaned, serviced, and filled with fruit. Thus, when pulping tank 32 has been emptied, pulping tank 34 may be operated while pulping tank 32 is cleaned, serviced and refilled.

Each of the pulping tanks 32 and 34 comprise, in the preferred embodiment of the invention, a pressure vessel for receiving gas under pressure from gas manifold 36. The gas manifold 36 is connected to a regulator 38 that regulates the gas from a source of gas under pressure 40. The gas in the source of gas under pressure 40 may be nitrogen, argon, helium, or any other gas desired for utilization in the feed system. That is, the gas under pressure is fed into the pulping tank 32 or 34 that is being utilized when it is desired to remove the pulped fruit from the pulping tank. It is preferred to utilize a gas feed system wherein the gas under pressure from the source of pressurized gas 40 is controlled by valves 32A for admission to pulping tank 32 and valve 34A for admission to pulping tank 34 and the pressure of which can be read by a pressure gauge such as pressure gauge 42 in each gas feed line. The pressurized gas is admitted adjacent to the removable top 44 when it is desired to fee the pulped fruit in its fluidlike consistency from the pulping tank 32. The gas pressure forces the pulped fruit in the direction indicated by the arrow 46 through a header pipe 48 connected to the bottom 50 of the pulping tank 32 ad the flow of which is controlled by valve means 52.

Similar structures are provided in pulping tank 34.

The pulped fruit flows through the piping system 48 under gas pressure in the direction indicated by the arrows 46a and 46b to the header pipes 54.

Thus, the structure so far described in connection with FIGS. 2 and 3 generally comprise the pulping stage 18 together with the associated feed and header means for transferring pulped fruit from the pulping tanks.

The cooking stage 20 is, in this embodiment of the invention, generally comprised of a drum means 60 having a pair of contrarotating drums 62 and 64. As shown more clearly in FIG. 3, it is seen that the drum 62 rotates in a counterclockwise direction and drum 64 rotates in clockwise direction. Each of the drums 62 and 64 have heated external surfaces 62' and 64' respectively, which, for example, may be heated by hot water flowing through a water supply system 66, in the directions indicated by the arrow 68, which directs hot water from a source of hot water 70 into each of the drums for maintaining the temperature of the external surfaces 62' and 64' at a predetermined temperature within a preselected temperature range such as, for example, a temperature range of 175° to 195°. This has been found to be an advantageous temperature range for the cooking of bananas. If other temperatures are required for the cooking of other fruits the appropriate temperature of the water in the piping system 66 may be selected. Further, it will be appreciated that in accordance with the well-known principles heretofore utilized, steam can be utilized to heat the external surfaces 62' and 64' as well as, as desired, any type of electrical resistance and/or radiant heater. The type of heating mechanism utilized to provide the heated external surface 62' and 64' may be selected as desired for particular installations.

The drum 62 rotates about an axis 72 and the drum 64 rotates about an axis 74 and axes 72 and 74 are substantially parallel to each other and defined a horizontal plane therebetween.

Any desired means may be employed for rotating the drums 62 and 64 such as electric motors, belt drives, gear drives, or the like (not shown). This provides the desired rotation of the drum 62 in the direction indicated by the arrow 80 the drum 64 in the opposite direction as indicated by the arrow 82 at a preferred rate of between 1 and 10 r.p.m.

In the embodiment of the invention shown in FIGS. 2 and 3 it can be seen that with the two drums 62 and 64 there are provided two headers 54, one adjacent each of the drums. The headers 54 are located in the quadrant of revolution of each drum where the external surfaces 62' and 64' are moving upwardly. The headers 54 are aligned substantially parallel to the axis of rotation 72 and 74 of the drums 62 and 64.

In a preferred embodiment of the invention the drum 62 may be relatively moveable with respect to the drum 64 as indicated by the double ended arrow 86 to provide a desired minimum clearance at 88. The minimum clearance 88 between the drums 62 and 64 helps provide the desired thickness of pulped material that flows onto the heated external surfaces 62' and 64'. The drums are rotatably supported in the support members 90 and 92. When the drum 62 is relatively moveable in the direction as indicated by the double ended arrow 86 there may be provided appropriate bellows or flexible tube section 94 of any line desired to allow such movement of the drum 62.

As described below in greater detail, a plurality of nozzle means 96 extend through the header 54 and the nozzle means 96 discharge the fluidlike pulp from the header means 54 onto the heated external surfaces 62' and 64' for cooking thereon. Thus, both header 54 and both drums 62 and 64 are continually utilized even though only one pulping tank 32 or 34 is being utilized.

The plurality of nozzle means 96 in spaced-apart array along the headers 54 throughout the axial length of the drum 62 so that there is substantially equal amounts of pulped material discharged at all portions of the drum means 60. This can be seen from FIGS. 2 and 3.

After the pulped fruit has been discharged onto the external surfaces 62' and 64' the drums 62 and 64 rotate toward each other reaching the point of minimum clearance at 88, and then rotate away from each other towards first cutter means 102 positioned adjacent the external surfaces 62' and 64' of the drums 62 and 64, respectively. The first cutter means 102 cuts the now cooked pulped fruit along first preselected cut-lines which, in this embodiment of the invention, comprise substantially circumferential oriented cut-lines so that a plurality of elongated strips circumferentially oriented on the drums 62 and 64 are generated. The first cutter means 102 is described below in greater detail.

After being cut into elongated strips the pulped fruit material on the external surfaces 62' and 64' pass adjacent a second cutter means 104 as positioned adjacent each of the drums 62 and 64 and the second cutter means 104 cuts the cooked pulp along second preselected cut-lines which, in this embodiment of the invention, extend in directions substantially parallel to the axes 72 and 74 of the drums 62 and 64 and throughout the axially length thereof.

The cut and cooked pulped fruit, still on the surfaces 62' and 64', then pass adjacent scraper means 106 which scrapingly removes the cooked and cut pulped fruit from the external surfaces 62' and 64' of the drums 62 and 64, respectively. The scraper means 106 is described in greater detail below.

After leaving the scraper means 106 the now separated individual chiplike means are forced in the directions indicated by the arrow 108 onto the transportation means 110 which, in the embodiment illustrated in FIGS. 2 and 3 comprises an endless belt 112 moving in the directions indicated by the arrows 114 to transport the chiplike product to remote locations such as the packaging station 26 (not shown in FIGS. 2 and 3).

If desired, cooling stage 24 provides a cooling gas flow from gas nozzle 116 which may be utilized to cool the chiplike flakes.

As shown in FIG. 2, the pulping tank 32 has the paddle means 33 rotated by an electric motor such as electric motor 35 to agitate the fruit that is placed therein and reduce same to a fluidlike pulp. If desired, during the loading of the pulping tank 32 additional nutrients such as vitamins, cereals, flour, minerals, sugar, salt, or flavorings or additives of any kind or nature including preservatives may be inserted.

Electric motor 35' may be utilized to rotate a similar paddle means in the pulping tank 34.

Each of the pulping tanks 32 and 34 are provided with a viewport such as viewports 37 and 39 comprising a transparent plate 31 in a gasket 33 so that the contents of the pulping tanks 32 and 34, respectively, may be viewed during the pulping operation.

It has been found that the drums 62 and 64 are preferably on the order of 26 inches long with a 26 inch diameter and rotate at from 1 to 10 revolutions per minute depending upon the exact thickness of the material, which is typically on the order of 3 to 6 millimeters, placed upon the external surfaces 62' and 64' and the temperature thereof, the viscosity and the degree of cooking desired.

NOZZLE MEANS

As mentioned above, the header 54 is provided with a plurality of nozzle means 96. A preferred form of the nozzle means 96 is illustrated in FIGS. 5 and 6. As shown thereon, the nozzle means 96 comprise a plurality of tubular members 120 and each of the tubular members 120 are substantially identical. The tubular members 120 are slideably mounted in the header means 54, as shown in FIG. 6, for movement in the direction indicated by the double ended arrow 122 towards and away from the heated surface 62' of the drum 62. Sealing means such as, for example, "0" rings 124 may be provided in the header 54 to provide sliding seals for the tubular members 120.

Each of the tubular members 120 have an interior portion 126 and an exterior discharge portion 128. The internal portion 126 has walls 130 defining a pulp receiving aperture 132 into which pulp from the header 54 is forced.

The external discharge portion 128 of each of the tubular members 120 is provided with walls 134 defining a discharge orifice 136. In the preferred embodiment of the invention the discharge orifice 136 has a preselected area that may be varied, for example, as illustrated in FIGS. 5 and 6, a plug means 140 may be threadingly engage the exterior end 142 of the tubular member 120 and move in the directions indicated by the double ended arrow 122 to open and close the discharge orifice 136.

Each tubular member 120 is provided with a wall 146 defining a pulp passage 148 to allow transmission of the fluidlike pulped fruit from the pulp receiving aperture 132 to the discharge orifice 136. Thus, pulped fruit is forced under gas pressure which, for example, may be on the order of 10 p.s.i. or so, from the pulping tanks 32 and 34 into the piping system 48 to the headers 54 and into the plurality of nozzle means 96 comprised of the plurality of tubular members 130. Such pulped fruit enters the pulp receiving aperture 132 of each of the tubular members 120, flows through the pulp passage 148 thereof and out the discharge orifice 136 onto the heated surface 62' of drum 62 or 64' of drum 64 for cooking thereon. The plurality of tubular members 120 may be spaced, for example, in a preselected spaced-apart relationship on the header means 54 and extending throughout the axial length of the drum means 60. For a drum 62 on the order of 26 inches long by 26 inches in diameter it has been found that a spacing of approximately seven-tenths of an inch between each of the tubular members 120 has proven advantageous

FIRST CUTTER MEANS

FIGS. 7 and 7A illustrate a preferred structural arrangement for the first cutter means 102 mentioned above. As shown above, the first cutter means 102 comprises a pair of first cutters 150, and one is mounted adjacent the external surface 62' and 64' of the drums 62 and 64, respectively, and is rotatably supported adjacent thereto on a rotational axis 105 that is substantially parallel to the axis of rotation 72 and 74 of the drum means 60. The first cutter means 102 extends throughout the substantially entire axial length of the drum means 60.

The structure comprising the first cutter 152 may be generally considered to comprise a first cutter axle 152 for rotation about the first cutter axis 105. A plurality of disclike knives 154 are coupled to the axle 152 for rotation therewith. Each of the disclike knives 154 has a circumferential cutting edge 156 and the disclike knives 154 are coupled to the axle means 152 in a predetermined spaced-apart relationship. For the above-mentioned 26 inch long drums 62 and 64, it has been found that a spacing of the disclike knives 154 on the order of seven-tenths of an inch, that is, similar to the spacing of the tubular members 120 comprising the nozzle means 96 described above, has provided satisfactory operation and desired size chips. As can be seen from FIGS. 7 ad 7A, the first cutter axle means 152 has narrow end portions 158 and 160 for rotatably supporting the plurality of disclike knives 154 on the supports 90 and 92.

The rotational axis of the axle means 152 together with the plurality of disclike knives 154 on each of the first cutters 102 about their axis of rotation 105 is provided by the rotation of the drum 62 or drum 64. That is, the first cutter means 102 does not require a separate rotational driving means but is merely rotated due its cooked pulp engaging relationship to the drums 62 and 64.

The first preselected cut-lines which the plurality of disclike knives 154 are oriented to provide in the cooked pulp are generally circumferentially oriented with respect to the drums 62 and 64. That is, the first preselected cut-lines cuts the cooked pulp on the drums 62 and 64 into a plurality of elongated strips extending around the portions of the drums 62 and 64 between the first cutter 102 and the scraper 106.

THE SECOND CUTTER

The second cutter means 104 is comprised of two second cutters 160, one mounted adjacent each of the drums 62 and 64. The second cutter 160 is mounted in cooked pulp cutting relationship to the heated external surfaces 62' and 64', as is the first cutter means 102, and cuts the cooked pulp that is deposited on the external surface of the drums 62 and 64 along second preselected cut-lines. The second preselected cut-lines extend, in this embodiment of the invention, in axial directions across the whole axial lanes of the drum means 60 and substantially parallel to the preselected axis of rotation 72 and 74 thereof.

Each second cutter 160 comprising the second cutter means 104 is generally comprised of a second cutter axle means 162 supported for rotational movement in, for example, the supports 90 and 92 shown on FIG. 3 for rotation about an axis 107. The axis 107 is substantially parallel to the predetermined axes of rotation 72 ad 74 of the first drum 62 and second drum 64, respectively.

An elongated cylinder 164 having an axial length substantially equal to the axial length of the drum means 60 is, in this embodiment of the invention, mounted on the second cutter axle means 162 for rotation therewith. However, it will be appreciated, that the cylinder 164 may be rotatably mounted on the axle 162 and the axle 162 mounted in the supports 90 and 92. Similarly, in the first cutter means 102 described above in connection with the description of FIG. 7 and 7A, it will be appreciated that the plurality of disclike knives 154 may be coupled to the generally cylindrical member 155 which inturn may be rotatably mounted on the axle 152 for rotation thereon, and the axle 152 rigidly coupled to the supports 90 and 92.

A plurality of elongated blades 166 which, as shown in FIG. 8 and 8A comprise four elongated blades 166 is coupled to the external surfaces of the elongated cylinder 164 and each one has cutting edges 166' which engage the cooked pulped fruit deposited on the external surfaces 62' and 64' of the drums 62 and 64 to cut the cooked pulped fruit deposited thereon along the second preselected cut-lines. The four elongated blades 166 extend throughout the axial length of the drum means 60 and the second predetermined cut-lines are substantially parallel to the axis of rotation of the drum means 60 and substantially perpendicular to the first preselected cut-lines generated by the first cutter means 102. The second cutter 160 is not separately powered for rotation but rotates under the driving of the drum 62 or 64. The spacing between adjacent external cutting edges 166' may be an arcuate length therebetween on the order of 1 to provide a chiplike flake from the cooked pulp on the order of seven-tenths of an inch wide by 1 long by 3 to 6 millimeters thick. It has been found that such a size is convenient for packaging as well as eating.

SCRAPER

The scraper 106 is illustrated on FIG. 9. As shown thereon the scraper 106 is positioned adjacent the external surfaces 62' and 64' in scraping engaging relationship thereto to scrape the cooked and cut thin flakelike chips provided from the cooked pulped fruit as indicated at 122 on FIG. 9 from the external surface 62'. The scraper 106 has a scraping edge 170 that scrapingly engages the external surface 64' to remove these chips 121 after they have been cut by the first cutter 102 and second cutter 104.

As also illustrated on FIG. 9, it may be desirable, in some application, to provide a cylindrical or tubular chip rather than a flat chip. It has been found that to achieve such a cylindrical or tubular shape a body member 172 may be coupled by, for example, bolts 174 to the scraper 106 and body member 172 has an arcuate portion 176 having arcuate walls 178 for engaging the chip 121 after it has been scraped by the scraper 106 from the external surface 62' of the drum 62. The arcuate shape of the wall 178 continues to roll the chip 121 into a generally tubular or cylindrical shape. It will be appreciated, though, that no such body member 172 need be utilized in the practice of the invention described herein. Alternatively, large or small amounts of curvature may be provided in such chips depending upon the radius of curvature of the wall 178.

GENERAL ARRANGEMENT

FIG. 10 illustrates a generally schematic representation of a general arrangement of the structure comprising the invention herein. As shown in FIG. 10, the drum 62 having the heated external surface 62' rotates in the direction indicated by the arrow 80 which, in this embodiment of the invention, is counterclockwise. The fluidlike pulp is discharged from the discharge orifice 136 of each of the tubular members 120 comprising the nozzle means 96. This forms a layer 121' on the external surface 62' of the drum 62 and rotation in the direction indicated by the arrow 80 provides a predetermined dwell time of the pulped fruit layer 121' on the external surface 62' before it reaches the first cutter means 102. As shown on FIG. 10, the first cutter means 102 is preferably positioned in cooked pulp cutting relationship to the cooked pulp 121' on the external surface 62' of the drum 60 below the horizontal plane 73 defined by the predetermined axis of rotation 72 and 74 of the drum means 60. Thus, the nozzle means 96 is spaced apart from the first cutter 102 in the direction indicated by the direction of rotation 80 of the drum means 62.

The second cutter 104 is also mounted in cooked pulp layer 121' cutting relationship to the external surface 62' of the drum 60 and is spaced apart from the first cutter means 102 in the direction of rotation 80. The scraper 106 is in cooked pulp layer 121' scraping engagement relationship to the external surface 62' and scrapes the thus provided chiplike members 121 therefrom. As shown on FIG. 10 there is no arcuate portion provided on he scraper 106 and thus the chips 110 are substantially flat chips and, with the spacing of the disclike knives 154 in the first cutter 102 and the elongated blades 166 on the second cutter 104, as above described, the chips are approximately seven-tenths of an inch wide by 1 inch long. The thickness is determined by the flow rate of the pulp from the discharge orifices 136 in the nozzle means 96 and the spacing between the drums 62 and 64 at the position 88, as described above.

If it is desired to provide a cold gas blast in cooling stage 24, a nozzle 116, a source of gas, such as air, nitrogen, argon, helium, or the like 190 together with associated regulator 192, valve 194 and pressure gauge 196 may be included to blast the chips 121 with the cold gas.

This concludes the description of the preferred embodiment of the invention herein. It will be appreciated by those skilled in the art that many variations and adaptations of this invention may be made and the following claims are intended to cover all such variations and adaptations falling within the true scope and spirit thereof.

What is claimed is new and desired to be secured by Letters Patent of the United States is:

1. In the manufacture of a food product of the type comprising a thin chiplike flake, the improvement comprising:
   fruit preparation means for preparing a fruit to be pulped;
   pulping means for receiving prepared fruit from said fruit preparation means and converting said prepared fruit into a fluidlike consistency pulp;
   feed means connected to said pulping means for receiving said fluidlike pulp from said feed means and transporting said fluidlike pulp to predetermined locations at preselected pulp feed rates;
   header means connected to said feed means for receiving said transported pulp means;
   a plurality of nozzle means mounted on said header means for receiving said fluidlike pulp means in said header means and discharging said fluidlike pulp means in preselected directions at preselected flow rates, and each of said nozzle means having walls defining a discharge orifice, and each of said discharge orifices having a preselected discharge area;
   drum means rotatably mounted in fluidlike pulp receiving relationship to said discharge orifice of each of said plurality of nozzle means, and said drum means having:
      heated external surfaces for receiving said fluidlike pulp from said nozzles and cooking said fluidlike pulp to a predetermined consistency;
      means for heating said external surfaces of said drum means to a predetermined temperature within a preselected temperature range;
      drum support means for rotatably supporting said heated drum means; and
      drive means for rotating said drum means at preselected rotational rates in preselected direction about a predetermined rotational axis;
   a first and a second cutter means counted adjacent said drum means and in cooked pulp cutting relationship to said external surfaces thereof for cutting said cooked pulp along first and second preselected cut-lines, respectively, to provide cooked chiplike flakes;
   scraper means mounted in scraping engaging relationship to said external surfaces of said drum means for scraping said cooked chiplike flakes from said heated external surfaces of said drum means;
   cooling means for cooling said cooked chiplike flakes; and
   transportation means for receiving said cooked chiplike flakes and transporting same to remote locations.
2. The arrangement defined in claim 1 wherein:
   said first cutter means is mounted in cooked pulp cutting relationship to said heated external surface of said drum means for cutting cooked pulp on said external surfaces of said drum means along said first preselected cut-lines to divide said cooked pulp into a plurality of elongated strips extending in circumferentially oriented relationship to said external surface of said heated drum means; and said second cutter means is mounted in cooked pulp cutting relationship to said heated external surface of said rum means for cutting said cooked pulp on said external surface of said drum means along said second preselected cut-lines, and said second preselected cut-lines extending substantially perpendicular to said first selected cut-lines and substantially parallel to said predetermined drum means rotational axis.

3. The arrangement defined in claim 2 wherein said first cutter means further comprises:

first cutter axle means;

a plurality of disclike knives having circumferential cutting edges coupled, in spaced-apart relationship to each other, on said first cutter axle means for rotation therewith; and first cutter axle support means for rotatably supporting said first cutter axle in spaced relationship to said drum means, whereby rotation of said drum means rotates said first cutter means.

4. The arrangement defined n claim 2 wherein said second cutter means further comprises:

a second cutter axle means;

an elongated cylinder rotatably mounted on said second cutter axle means and in spaced-apart relationship to said heated external surface of said drum means, and said second cutter axle means extending substantially parallel to said predetermined rotational axis of said drum means, and said cylinder means substantially axially coextensive with said drum means;

a plurality of elongated blade means coupled to external surface of said cylinder means in a preselected spaced-apart relationship therearound and extending outwardly therefrom, and said plurality of blade means extending substantially parallel to said second cutter axle means and substantially continuously along the axial length of said elongated cylinder, and each of said plurality of blades having external cutting edges, and said external cutting edges of said blades cutting said cooked pulp along said second preselected cut-lines; and second cutter axle support means for supporting said wherein cutter axle means, whereby rotation of said drum means rotates said second cutter means.

5. The arrangement defined in claim 4 wherein said first cutter means further comprises:

first cutter axle means;

a plurality of disclike knives having circumferential cutting edges coupled in spaced-apart relationship to each other on said first cutter axle means for rotation therewith; and first cutter axle support means for rotatably supporting said first cutter axle in spaced relationship to said drum means, whereby rotation of said drum means rotates said first cutter means.

6. The arrangement defined in claim 2 wherein said drum means is a pair of drums further comprising:

a first and a second substantially similar, cylindrical, axially elongated drum mounted on said drum support means for rotation on a pair of substantially parallel spaced-apart rotational axes comprising said predetermined rotational axes, and said external surfaces of said pair of drums in a predetermined spaced-apart relationship to provide a predetermined minimum clearance therebetween, and said first drum rotating in a first direction and said second drum rotating in a second direction opposite said first direction.

7. The arrangement defined in claim 6 wherein:

the first of said pair of drums is moveable with respect to the second of said pair of drums to vary said preselected distance of separation therebetween within a predetermined range.

8. The arrangement defined in claim 7 wherein:

said first cutter means comprises a pair of first cutters, one of said pair of first cutters adjacent said first drum and the other of said pair of first cutters adjacent said second drum, and each of said pair of first cutters further comprises:

first cutter axle means;

a plurality of disclike knives having circumferential cutting edges coupled, in spaced-apart relationship to each other, on said first cutter axle means for rotation therewith; and first cutter axle support means for rotatably supporting said first cutter axle in spaced relationship to said first drum, whereby rotation of said first drum rotates said first cutter means;

said second cutter means comprises a pair of second cutters, one of said pair of second cutters adjacent said first drum and the other of said pair of second cutters adjacent said second drum, and each of said second cutters further comprising:

a second cutter axle means;

an elongated cylinder rotatably mounted on said second cutter axle means and in spaced-apart relationship to said heated external surface of said second drum, and said second cutter axle means extending substantially parallel to said predetermined rotational axis of said second drum, and said cylinder means substantially axially coextensive with said second drum;

a plurality of elongated blade means coupled to external surface of said cylinder means in a preselected spaced-apart relationship therearound and extending outwardly therefrom, and said plurality of blade means extending substantially parallel to said second cutter axle means and substantially continuously along the axial length of said elongated cylinder, and each of said plurality of blades having external cutting edges, and said external cutting edges of said blades cutting said cooked pulp along said second preselected cut-lines; and second cutter axle support means for supporting said second cutter axle means, whereby rotation of said second drum rotates said second cutter means.

9. The arrangement defined in claim 8 wherein:

each of said second cutters is spaced apart a preselected distance from one of said first cutters in the direction of rotation of the adjacent drum;

said scraper means comprises a pair of scrapers, and one of said pair of scrapers is spaced apart from each of said second cutters a preselected distance in the direction of rotation of said adjacent drum.

10. The arrangement defined in claim 9 wherein:

each of said scrapers further comprises a curved elongated body member extending substantially throughout the axial length of said drum means for receiving said cooked and cut pulp from said scraper means and curling same into cylindrical configurations.

11. The arrangement defined in claim 2 wherein:

said plurality of nozzle means comprises a plurality of elongated tubular members moveably mounted in said header means and mounted in spaced-apart relationship to each other along the axial length of said heated external surface of said drum means, and each of said tubular members having:

a discharge portion having said discharge orifice therein and external said header means and adjacent said heated external surface of said drum means;

an internal portion positioned within said header means, and said internal portion having walls defining a pulp receiving aperture therein; and walls defining a pulp passage from said pulp receiving aperture said discharge orifice;

and said pulp is forced by said feed means into said header and from said header into said pulp receiving apertures of said plurality of tubular members, through said pulp passage therein, and out said discharge orifice;

and said plurality of tubular members are individually moveable towards and away from said heated external surface of said drum means.

12. The arrangement defined in claim 11 wherein each of said tubular members further comprises:
means for varying said preselected discharge area of said discharge orifice.

13. The arrangement defined in claim 12 wherein:
said first cutter means further comprises:
  first cutter axle means;
  a plurality of disclike knives having circumferential cutting edges coupled in spaced-apart relationship to each other on said first cutter axle means for rotation therewith;
  first cutter axle support means for rotatably supporting said first cutter axle in spaced relationship to said drum means, whereby rotation of said drum means rotates said first cutter means;
and said second cutter means further comprises:
  a second cutter axle means;
  an elongated cylinder rotatably mounted on said second cutter axle means and in spaced-apart relationship to said heated external surface of said drum means, and said second cutter axle means extending substantially parallel to said predetermined rotational axis of said drum means, and said cylinder means substantially axially coextensive with said drum means;
  a plurality of elongated blade means coupled to external surface of said cylinder means in a preselected spaced-apart relationship therearound and extending outwardly therefrom, and said plurality of blade means extending substantially parallel to said second cutter axle means and substantially continuously along the axial length of said elongated cylinder, and each of said plurality of blades having external cutting edges, and said external cutting edges of said blades cutting said cooked pulp along said second preselected cut-lines; and
  second cutter axle support means for supporting said second cutter axle means whereby rotation of said drum means rotates said second cutter means.

14. The arrangement defined in claim 12 wherein said drum means is a pair of drums further comprising:
a first and a second substantially similar, cylindrical, axially elongated drum mounted on said drum support means for rotation a pair of substantially parallel spaced-apart rotational axes comprising said predetermined rotational axes, and said external surfaces of said pair of drums in a predetermined spaced-apart relationship to provide a predetermined minimum clearance therebetween, and said first drum rotating in a first direction and said second drum rotating in a second direction opposite the first direction;
the first of said pair of drums moveable with respect to the second of said pair of drums to vary said preselected distance of separation therebetween within a predetermined range;
said first cutter means comprises a pair of first cutters, one of said pair of first cutters adjacent said first drum and the other of said pair of first cutters adjacent said second drum, and each of said pair of first cutters further comprises:
  first cutter axle means;
  a plurality of disclike knives having circumferential cutting edges coupled, in spaced-apart relationship to each other, on said first cutter axle means for rotation therewith; and
  first cutter axle support means for rotatably supporting said first cutter axle in spaced relationship to said first drum, whereby rotation of said first drum rotates said first cutter means;
said second cutter means comprises a pair of second cutters, one of said pair of second cutters adjacent said first drum and the other of said pair of second cutters adjacent said second drum, and each of said second cutters further comprising:
  a second cutter axle means;
  an elongated cylinder rotatably mounted on said second cutter axle means and in spaced-apart relationship to said heated external surface of said second drum, and said second cutter axle means extending substantially parallel to said predetermined rotational axis, of said second drum, and said cylinder means substantially axially coextensive with said second drum;
  a plurality of elongated blades means coupled to external surface of said cylinder means in a preselected spaced-apart relationship therearound and extending outwardly therefrom, and said plurality of blade means extending substantially parallel to said second cutter axle means and substantially continuously along the axial length of said elongated cylinder, and each of said plurality of blades having external cutting edges, and said external cutting edges of said blades cutting said cooked pulp along said second preselected cut-lines; and
  second cutter axle support means for supporting said second cutter axle means whereby rotation of said second drum rotates said second cutter means.

15. The arrangement defined in claim 14 and further comprising:
each of said second cutters is spaced apart a preselected distance from one of said first cutters in the direction of rotation of the adjacent drum;
said scraper means comprises a pair of scrapers, and one of said pair of scrapers is spaced apart from each of said second cutters a preselected distance in the direction of rotation of said adjacent drum;
each of said scraper means further comprises:
  curved elongated body member extending substantially throughout the axial length of each of said drums for receiving said cooked chiplike flakes from said scraper means and curling same into cylindrical configuration; and
said plurality of nozzle means is spaced apart a preselected distance from said scraper means in the direction of rotation of said adjacent drum.

16. The arrangement defined in claim 2 wherein:
said feed means comprises:
  a source of pressurized gas;
  means for regulating the pressure of said gas; and
  means for introducing said gas into said pulping means.

17. The arrangement defined in clam 16 wherein:
said pulping means comprises a pair of gas tight pulping tanks;
said drum means is a pair of drums comprising a first and a second substantially similar, cylindrical, axially elongated drum mounted on said drum support means for rotation on a pair of substantially parallel spaced-apart rotational axes comprising said predetermined rotational axes, and said external surfaces of said pair of drums in a predetermined spaced-apart relationship to provide a predetermined minimum clearance therebetween, and said first drum rotating in a first direction and said second drum rotating in a second direction opposite said first direction;
the first of said pair of drums is moveable with respect to the second of said pair of drums to vary said preselected distance of separation therebetween within a predetermined range;
said first cutter means comprises a pair of first cutters, one of said pair of first cutters adjacent said first drum and the other of said pair of first cutters adjacent said second drum, and each of said pair of first cutters further comprises:
  first cutter axle means;
  a plurality of disclike knives having circumferential cutting edges coupled in spaced-apart relationship to each other on said first cutter axle means for rotation therewith;

first cutter axle support means for rotatably supporting said first cutter axle in spaced relationship to said first drum, whereby rotation of said first drum rotates said first cutter means; and said second cutter means comprises a pair of second cutters, one of said pair of second cutters adjacent said first drum and the other of said pair of second cutters adjacent said second drum, and each of said second cutters further comprises:

a second cutter axle means;

an elongated cylinder rotatably mounted on second cutter axle means and in spaced-apart relationship to said heated external surface of said second drum, and said second cutter axle means extending substantially parallel to said predetermined rotational axis of said second drum, and said cylinder means substantially axially coextensive with said second drum;

a plurality of elongated blade means coupled to external surface of said cylinder means in a preselected spaced-apart relationship therearound and extending outwardly therefrom, and said plurality of blade means extending substantially parallel to said second cutter axle means and substantially continuously along the axial length of said elongated cylinder, and each of said plurality of blades having external cutting edges, and said external cutting edges of said blades cutting said cooked pulp along said second preselected cut-lines; and second cutter axle support means for supporting said second cutter axle means whereby rotation of said second drum rotates said second cutter means.

18. The arrangement defined in claim 17 wherein:

each of said second cutters is spaced apart a preselected distance from one of said first cutters in the direction of rotation of the adjacent drum;

said scraper means comprises a pair of scrapers, and one of said pair of scrapers is spaced apart from each of said second cutters a preselected distance in the direction of rotation of said adjacent drum;

each of said scrapers further comprises a curved elongated body member extending substantially throughout the axial length of said drum for receiving said cooked and cut pulp from said scraper means and curling same in cylindrical configurations;

said plurality of nozzle means comprises a plurality of elongated tubular members moveably mounted in said header means and mounted in spaced-apart relationship to each other along the axial length of said heated external surface of said drum means, and each of said tubular members having:

a discharge portion having said discharge orifice therein and external said header means and adjacent said heated external surface of said drum means; and an internal portion positioned within said header means, and said internal portion having walls defining a pulp receiving aperture therein; and walls defining a pulp passage from said pulp receiving aperture to said discharge orifice; and said pulp is forced by said feed means into said header and from said header into said pulp receiving apertures of said plurality of tubular members, through said pulp passage and out said discharge orifice; and said plurality of tubular members are individually moveable towards and away from said heater external surface of said drum means; and means for varying said preselected discharge area of said discharge orifice.